United States Patent
Muramatsu et al.

(10) Patent No.: US 10,118,482 B2
(45) Date of Patent: Nov. 6, 2018

(54) VEHICLE BODY STRUCTURE

(71) Applicant: HONDA MOTOR CO., LTD., Tokyo (JP)

(72) Inventors: Yuki Muramatsu, Wako (JP); Hiroyuki Hattori, Wako (JP); Taichi Nezasa, Wako (JP); Akifumi Katsuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 15/334,858

(22) Filed: Oct. 26, 2016

(65) Prior Publication Data
US 2017/0113542 A1   Apr. 27, 2017

(30) Foreign Application Priority Data
Oct. 27, 2015  (JP) .................................. 2015-211325

(51) Int. Cl.
B60K 15/06   (2006.01)
B60K 15/063   (2006.01)
(Continued)

(52) U.S. Cl.
CPC .............. B60K 15/063 (2013.01); B60K 1/04 (2013.01); B60K 6/405 (2013.01);
(Continued)

(58) Field of Classification Search
CPC ........ B60K 15/063; B60K 1/04; B60K 6/405; B60K 2001/0438; B60K 2015/0638; B60K 2015/0634; B62D 25/2027; B62D 63/025; B60L 2270/40; B60Y 2304/03; B60Y 2304/05; B60Y 2304/072;
(Continued)

(56) References Cited

U.S. PATENT DOCUMENTS

2011/0284299 A1   11/2011 Takahashi et al.
2017/0106743 A1*   4/2017 Ajisaka .................. B60K 13/04
(Continued)

FOREIGN PATENT DOCUMENTS

JP        3045269 B2      5/2000
JP    2013-244764 A     12/2013
(Continued)

OTHER PUBLICATIONS

Office Action dated May 30, 2018, issued in counterpart Chinese Application No. 201610953404.1, with English translation. (13 pages).

Primary Examiner — Jacob D Knutson
Assistant Examiner — Marlon A Arce
(74) Attorney, Agent, or Firm — Westerman, Hattori, Daniels & Adrian, LLP

(57) ABSTRACT

A vehicle body structure includes a first middle floor unit for a gasoline vehicle and a second middle floor unit for a hybrid vehicle, and the first and second middle floor units are made interchangeable with each other. A front floor unit and a rear floor unit are made shareable by the gasoline vehicle and the hybrid vehicle. That is, the front floor unit and the rear floor unit can be regarded as a platform. Additionally, the second middle floor unit includes a housing, and an IPU is stored in an interior of the housing.

11 Claims, 7 Drawing Sheets

(51) Int. Cl.
*B60K 1/04* (2006.01)
*B60K 6/405* (2007.10)
*B62D 25/20* (2006.01)
*B62D 63/02* (2006.01)

(52) U.S. Cl.
CPC ....... *B62D 25/2027* (2013.01); *B62D 63/025* (2013.01); *B60K 2001/0438* (2013.01); *B60K 2015/0634* (2013.01); *B60K 2015/0638* (2013.01); *B60L 2270/40* (2013.01); *B60Y 2304/03* (2013.01); *B60Y 2304/05* (2013.01); *B60Y 2304/072* (2013.01); *B60Y 2304/078* (2013.01); *B60Y 2306/01* (2013.01); *B60Y 2400/112* (2013.01); *Y10S 903/951* (2013.01); *Y10S 903/952* (2013.01)

(58) Field of Classification Search
CPC .......... B60Y 2304/078; B60Y 2306/01; B60Y 2400/112; Y10S 903/951
See application file for complete search history.

(56) References Cited

U.S. PATENT DOCUMENTS

2017/0106916 A1* 4/2017 Ajisaka ................. B62D 25/20
2018/0072184 A1* 3/2018 Lang ................... B60L 11/1879

FOREIGN PATENT DOCUMENTS

JP   2014-208518 A   11/2014
JP       5760992 B2    8/2015

* cited by examiner

VEHICLE BODY STRUCTURE

CROSS REFERENCES TO RELATED APPLICATIONS

The present application claims priority under 35 U.S.C. § 119 to Japanese Patent Application No. 2015-211325, filed Oct. 27, 2015, entitled "Vehicle Body Structure." The contents of this application are incorporated herein by reference in their entirety.

TECHNICAL FIELD

The present disclosure relates to a vehicle body structure having a platform shared by two types of vehicles, a gasoline vehicle and a hybrid vehicle.

BACKGROUND

A known vehicle body structure is one in which an electrical component (IPU) to be provided in a hybrid vehicle is arranged in a luggage room and which has a platform designed to be shared by a hybrid vehicle and a gasoline vehicle for a reduction in manufacturing cost (see, for example, Japanese Unexamined Patent Application Publication No. 2014-208518).

The vehicle body structure, however, involves arrangement of an electrical component in the luggage room, which interferes with securement of a large space in the luggage room.

Another known vehicle body structure is one for a hybrid vehicle in which a cover member or the like is mounted below a rear seat to form a storage space, a battery is stored in the storage space, and a fuel tank is arranged behind the battery in a vehicle longitudinal direction (see, for example, Japanese Patent No. 5760992).

The vehicle body structure, however, involves the need to form the storage space for the battery using the cover member or the like. This increases the number of components and interferes with a reduction in manufacturing cost and vehicle body weight.

Still another known vehicle body structure is one for an electric automobile in which an electrical component is provided below a rear seat to secure a large space in a vehicle interior (see, for example, Japanese Patent No. 3045269).

In the vehicle body structure, however, a space for arranging a fuel tank is difficult to secure, and sharing of a platform with a gasoline vehicle is difficult.

Yet another known vehicle body structure is one for an electric automobile in which an electrical component is provided below a rear seat, and the electrical component is protected by a cross-member or the like (see, for example, Japanese Unexamined Patent Application Publication No. 2013-244764).

In the vehicle body structure, however, a space for arranging a fuel tank is difficult to secure, and sharing of a platform with a gasoline vehicle is difficult. In terms of protecting the electrical component from an impact load associated with a collision, a reinforcing member is further desired. This increases the number of components and interferes with a reduction in manufacturing cost and vehicle body weight.

SUMMARY

The present application describes, for example, provision of a vehicle body structure which has implemented sharing of a platform by a gasoline vehicle and a hybrid vehicle to reduce a manufacturing cost, secure a large luggage space, and reduce weight.

According to a first aspect of the present disclosure, there is provided a vehicle body structure settable in a gasoline vehicle and a hybrid vehicle, in which the vehicle body structure includes at least a front floor unit, a rear floor unit, and a middle floor unit which couples the front floor unit and the rear floor unit, the gasoline vehicle and the hybrid vehicle share the front floor unit and the rear floor unit, a gasoline-vehicle middle floor unit and a hybrid-vehicle middle floor unit which are interchangeable with each other is set as the middle floor unit, the gasoline-vehicle middle floor unit includes a kick-up portion which extends upward and a planar portion which extends rearward from an upper end portion of the kick-up portion such that the planar portion is substantially flat, the hybrid-vehicle middle floor unit includes a housing which has an opening at an upper portion and has a hollow extending downward from the opening, the housing having an electrical component provided in an interior of the housing, the gasoline vehicle includes a fuel tank which extends below the gasoline-vehicle middle floor unit and the rear floor unit, and the hybrid vehicle includes a fuel tank which is arranged below the rear floor unit.

As described above, two types of units, a gasoline-vehicle one and a hybrid-vehicle one, are prepared as the middle floor unit, and the two types of units are made interchangeable with each other. Thus, a combination of the front floor unit and the rear floor unit can be shared as the platform by the vehicles. This allows a reduction in manufacturing costs of the gasoline vehicle and the hybrid vehicle.

The gasoline vehicle here refers to a vehicle including only an internal combustion engine as a drive source.

The hybrid vehicle here refers to a vehicle including a drive source and an electric motor (motor).

In the case of the gasoline vehicle, the whole of a space of the middle floor unit can be used as a space for arranging the fuel tank. Thus, the fuel tank can be shaped such that a size suitable for the gasoline vehicle is ensured.

The hybrid vehicle is more fuel-efficient than the gasoline vehicle. That is, the fuel tank of the hybrid vehicle can be made smaller, as compared with the gasoline vehicle. Thus, the electrical component (for example, an IPU) can be arranged in a remaining space of the middle floor unit. With this configuration, the electrical component need not be arranged on a rear floor, unlike related art. A large luggage space can be secured.

Additionally, the middle floor unit is made interchangeable. As compared with a vehicle type as in related art in which the electrical component is provided on the rear floor to achieve sharing by the vehicles, it is possible to keep weight balances of the gasoline vehicle and the hybrid vehicle the same and improve dynamic performance of the vehicles.

The arrangement of the electrical component that is a heavy load at a central portion of the hybrid vehicle enhances the dynamic performance of the hybrid vehicle. The housing storing the electrical component is provided at the middle floor unit, which ensures rigidity of the middle floor unit.

Thus, a reinforcing member need not be provided for the middle floor unit to ensure rigidity and protect the electrical component, which achieves a reduction in weight of the hybrid vehicle.

According to a second aspect of the present disclosure, it is preferable that the hybrid-vehicle middle floor unit includes, at a front end portion of the housing, a first cross-member which extends in a vehicle width direction and that the first cross-member is formed to have a closed cross-section.

As described above, the first cross-member is formed at the front end portion of the housing and is extended in the vehicle width direction. Thus, an impact load applied due to a lateral collision can be supported by the first cross-member. This allows the first cross-member to protect a passenger and the electrical component.

The first cross-member is formed to have a closed cross-section. With this configuration, the first cross-member enhances rigidity of the vehicle body structure, which allows improvement of riding comfort of a passenger.

According to a third aspect of the present disclosure, the first cross-member is preferably joined to a rear end portion of a floor tunnel.

Thus, an impact load applied due to a lateral collision can be transmitted to the floor tunnel via the first cross-member. This allows the floor tunnel to support an impact load and protect a passenger and the electrical component.

The formation of the rear end portion of the floor tunnel at the first cross-member can reduce spread of the floor tunnel and distortion in a direction in which the floor tunnel sinks. Thus, rigidity of a floor panel is ensured by the floor tunnel. This enhances rigidity of a mounting portion of a front seat mounted to the floor panel and allows improvement of the riding comfort of a passenger.

The rear end portion of the floor tunnel is formed at the first cross-member. Thus, an impact load applied due to a front collision can be transmitted (dispersed) to the first cross-member via the floor tunnel. This allows favorable support of an impact load applied due to a front collision in a vehicle body.

According to a fourth aspect of the present disclosure, a rear seat is preferably mounted to the first cross-member.

The first cross-member is formed to have a closed cross-section and is a member with high rigidity. The mounting of the rear seat to the first cross-member enhances rigidity of a mounting portion of the rear seat and allows improvement of the riding comfort of a passenger.

According to a fifth aspect of the present disclosure, it is preferable that the hybrid-vehicle middle floor unit includes, at a rear end portion of the housing, a second cross-member which extends in a vehicle width direction and that the second cross-member is formed to have a closed cross-section.

As described above, the second cross-member is formed at the rear end portion of the housing and is extended in the vehicle width direction. Thus, an impact load applied due to a lateral collision can be supported by the second cross-member together with the first cross-member. This allows the first cross-member and the second cross-member to more favorably protect a passenger and the electrical component.

The second cross-member is formed to have a closed cross-section. This allows the first cross-member and the second cross-member to enhance the rigidity of the vehicle body structure and more favorably improve the riding comfort of a passenger.

According to a sixth aspect of the present disclosure, a tank band which supports the fuel tank for the hybrid vehicle is preferably mounted to the second cross-member.

As described above, the mounting of the tank band to the second cross-member allows the second cross-member with high rigidity to support the fuel tank. Thus, inertial movement of the fuel tank can be inhibited by the second cross-member, for example, at the time of a lateral collision. This allows avoidance of contact of a valve (for example, a pressure regulating valve) of the fuel tank with a vehicle body and fuel leakage due to a centrifugal force.

The fuel tank is supported by the second cross-member with high rigidity. Thus, the second cross-member can inhibit vibration from being transmitted from a pump incorporated in the fuel tank. It is thus possible to reduce noise in a vehicle interior caused by vibration transmitted from the pump.

According to a seventh aspect of the present disclosure, it is preferable that the housing includes a storage portion in which the electrical component is provided, an opening member which is provided on an outer side in a vehicle width direction of the storage portion and has a harness through-hole, through which a wire harness is passed, and an overhanging portion which is provided on the outer side in the vehicle width direction of the opening member and that a plate thickness dimension of the opening member is larger than a plate thickness dimension of the overhanging portion.

A relatively high voltage is applied to the wire harness connected to the electrical component of the hybrid vehicle. For this reason, the wire harness needs to be protected from an impact load, for example, at the time of a collision.

The plate thickness dimension of the opening member, through which the wire harness is passed, is made larger than the plate thickness dimension of the overhanging portion on the outer side in the vehicle width direction of the opening member. Accordingly, at the time of a collision, shock energy can be absorbed through crush of the overhanging portion on the outer side in the vehicle width direction. Deformation of the opening member due to an impact load can be reduced by the larger plate thickness dimension of the opening member.

This allows the opening member to protect the wire harness and the electrical component in an interior of the housing and ensures safety of a passenger.

BRIEF DESCRIPTION OF THE DRAWINGS

The advantages of the disclosure will become apparent in the following description taken in conjunction with the following drawings.

DETAILED DESCRIPTION

Embodiments of the present disclosure will be described below with reference to the accompanying drawings. Note that the terms "front (Fr)", "rear (Rr)", "left (L)", and "right (R)" refer to directions as viewed from a driver.

[Embodiment]

A vehicle body structure 10 according to an embodiment will be described.

Figure 1:
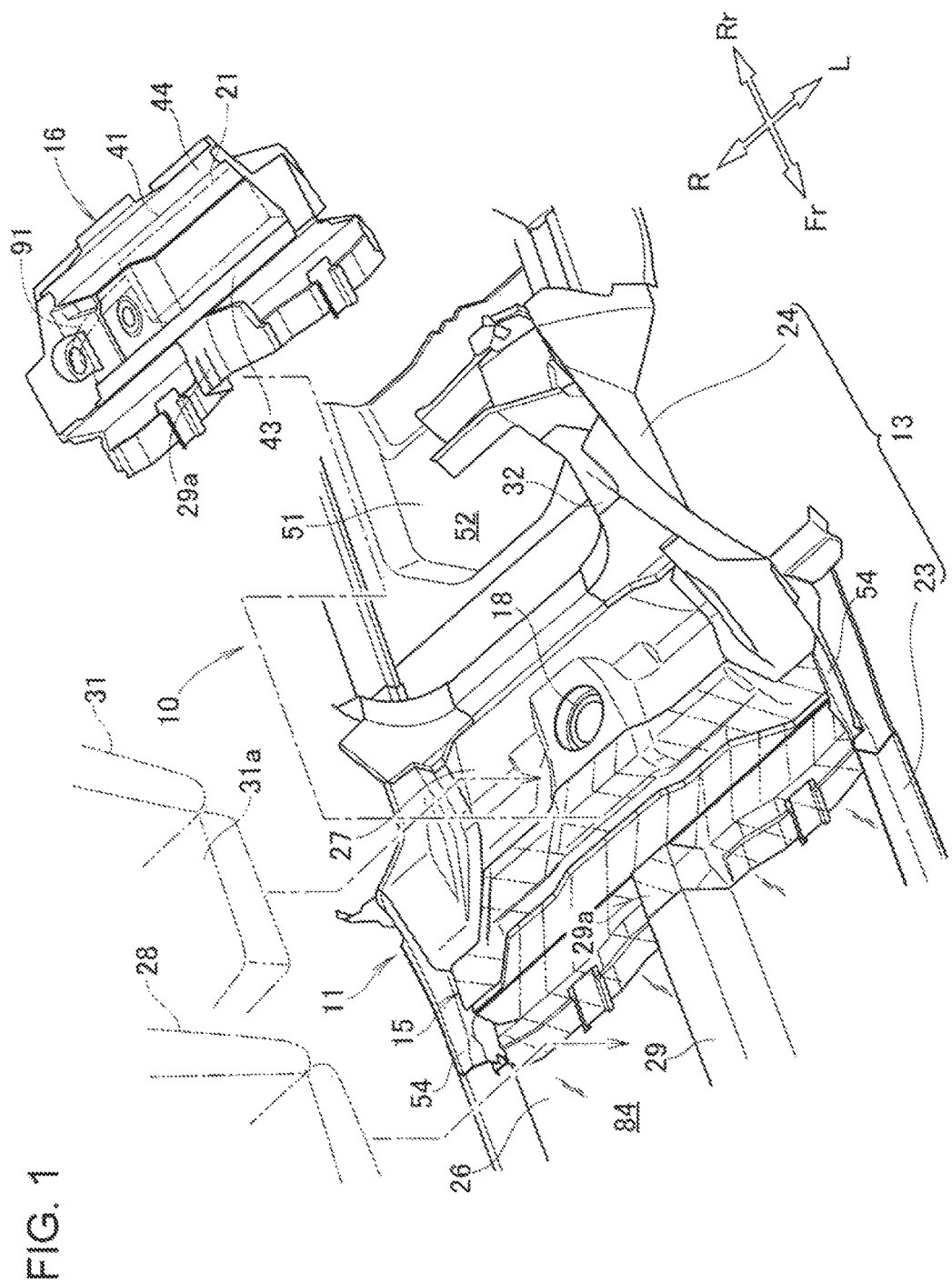
FIG. 1 is a perspective view showing a gasoline vehicle having a vehicle body structure according to one embodiment of the present disclosure and a first middle floor unit.
Figure 2:
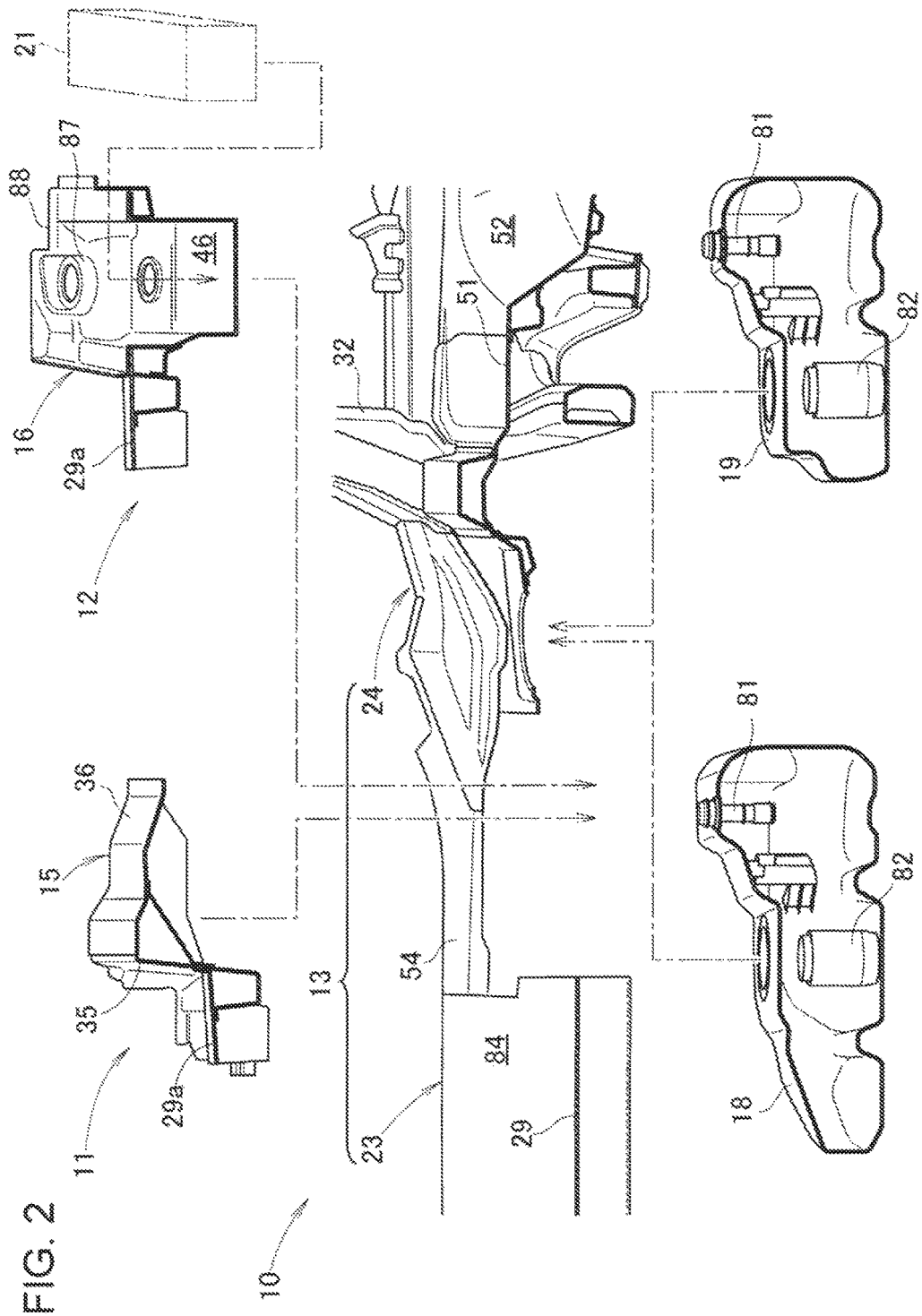
FIG. 2 is a cross-sectional view showing a state in which the vehicle body structure in FIG. 1 is divided.

As shown in FIGS. 1 and 2, the vehicle body structure 10 includes a platform 13 which is shared by a gasoline vehicle 11 and a hybrid vehicle (an HEV) 12, a gasoline-vehicle middle floor unit 15 which is to be assembled to the platform 13, and a hybrid-vehicle middle floor unit 16 which is to be assembled to the platform 13.

The gasoline-vehicle middle floor unit 15 and the hybrid-vehicle middle floor unit 16 are interchangeable with each other for the platform 13.

The vehicle body structure 10 includes a fuel tank 18 for a gasoline vehicle, a fuel tank 19 for a hybrid vehicle, and an IPU (electrical component) 21 for a hybrid vehicle.

The gasoline vehicle 11 here refers to a vehicle including only an internal combustion engine as a drive source.

The hybrid vehicle 12 here refers to a vehicle including a drive source and an electric motor (motor).

Hereinafter, the gasoline-vehicle middle floor unit 15 to be assembled to the vehicle body structure 10 of a gasoline vehicle will be referred to as a "first middle floor unit 15". The hybrid-vehicle middle floor unit 16 to be assembled to the vehicle body structure 10 of a hybrid vehicle will be referred to as a "second middle floor unit 16".

The fuel tank 18 for a gasoline vehicle will be referred to as a "first fuel tank 18". The fuel tank 19 for a hybrid vehicle will be referred to as a "second fuel tank 19".

The platform 13 includes a front floor unit 23 which includes a front floor panel 26 and a rear floor unit 24 which includes a rear floor panel 27.

The front floor unit 23 includes the front floor panel 26 that supports a front seat 28 and a floor tunnel 29 which is provided at the center in a vehicle width direction of the front floor panel 26.

The rear floor unit 24 is provided behind and spaced apart from the front floor unit 23 in a vehicle longitudinal direction. The rear floor unit 24 includes the rear floor panel 27 that supports a rear portion 31a of a rear seat 31 and a rear bulkhead 32 which rises up from the rear floor panel 27.

The first middle floor unit 15 is interposed between the front floor unit 23 and the rear floor unit 24. The front floor unit 23 and the rear floor unit 24 are coupled by the first middle floor unit 15.

Thus, the front floor unit 23, the first middle floor unit 15, and the rear floor unit 24 constitute the gasoline vehicle 11.

The second middle floor unit 16 is interposed between the front floor unit 23 and the rear floor unit 24. The front floor unit 23 and the rear floor unit 24 are coupled by the second middle floor unit 16.

Thus, the front floor unit 23, the second middle floor unit 16, and the rear floor unit 24 constitute the hybrid vehicle 12.

As described above, the first middle floor unit 15 for the gasoline vehicle 11 and the second middle floor unit 16 for the hybrid vehicle 12 are prepared, and the two types of units 15 and 16 are made interchangeable with each other.

Thus, a combination of the front floor unit 23 and the rear floor unit 24 can be shared as the platform 13 by the gasoline vehicle 11 and the hybrid vehicle 12. This allows a reduction in manufacturing costs of the gasoline vehicle 11 and the hybrid vehicle 12.

Figure 3:
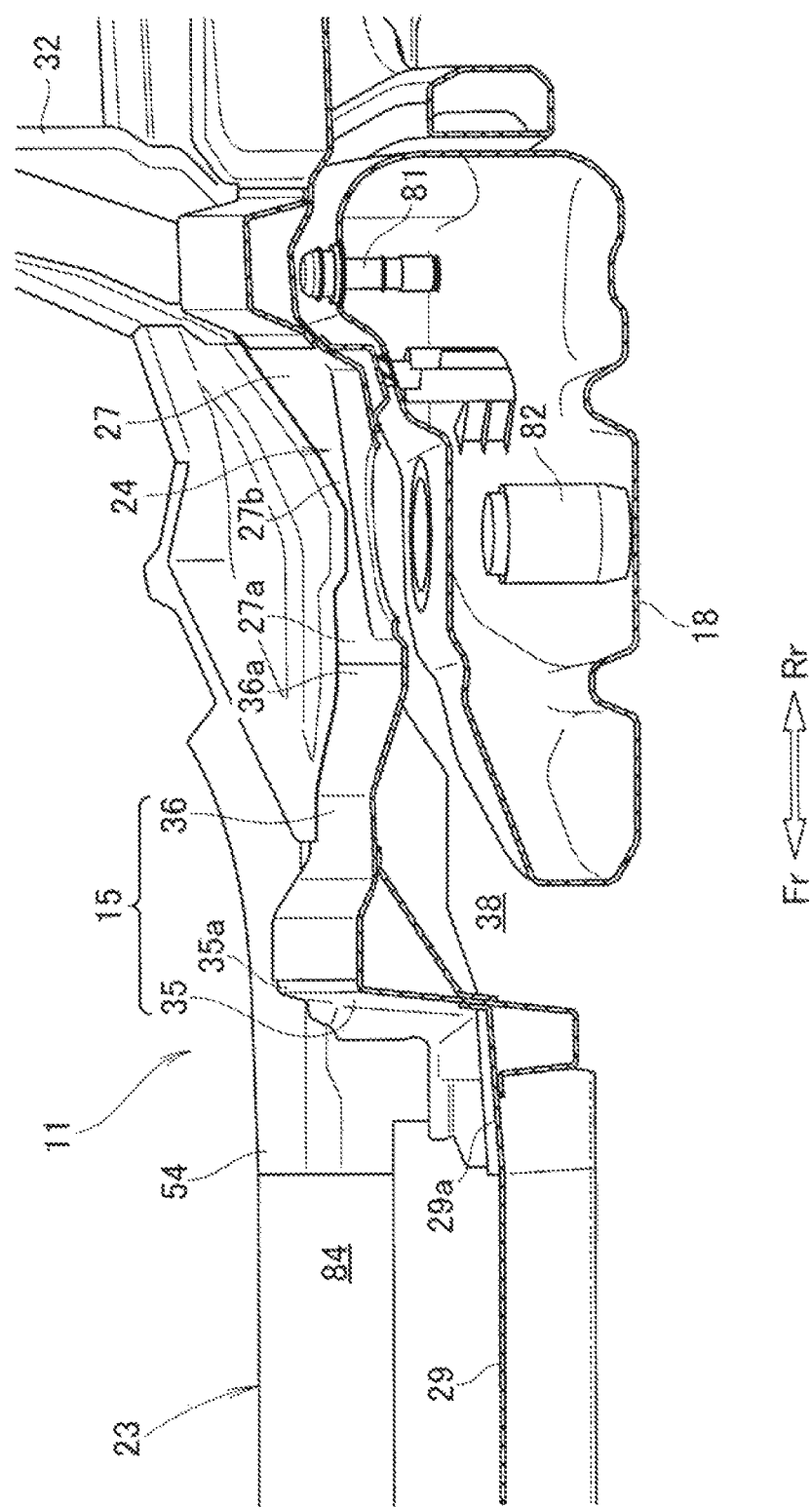
FIG. 3 is a cross-sectional view showing the gasoline vehicle according to one embodiment of the present disclosure.

As shown in FIG. 3, in the gasoline vehicle 11, the front floor unit 23 and the rear floor unit 24 are coupled by the first middle floor unit 15, and the first fuel tank 18 extends below the first middle floor unit 15 and the rear floor unit 24.

The first middle floor unit 15 includes a kick-up portion 35 which extends substantially upward and a planar portion 36 which extends rearward from an upper end portion 35a of the kick-up portion 35 such that the planar portion 36 is substantially flat. A rear end portion 36a of the planar portion 36 is joined to a front end portion 27a of the rear floor panel 27. With this configuration, a space 38 of the gasoline vehicle 11 is formed to be relatively large below the planar portion 36 and a front portion 27b of the rear floor panel 27.

The whole of the space 38 of the gasoline vehicle 11 can be used as an arrangement space for the first fuel tank 18. Thus, the first fuel tank 18 can be shaped such that a size suitable for the gasoline vehicle 11 is ensured.

Figure 4:
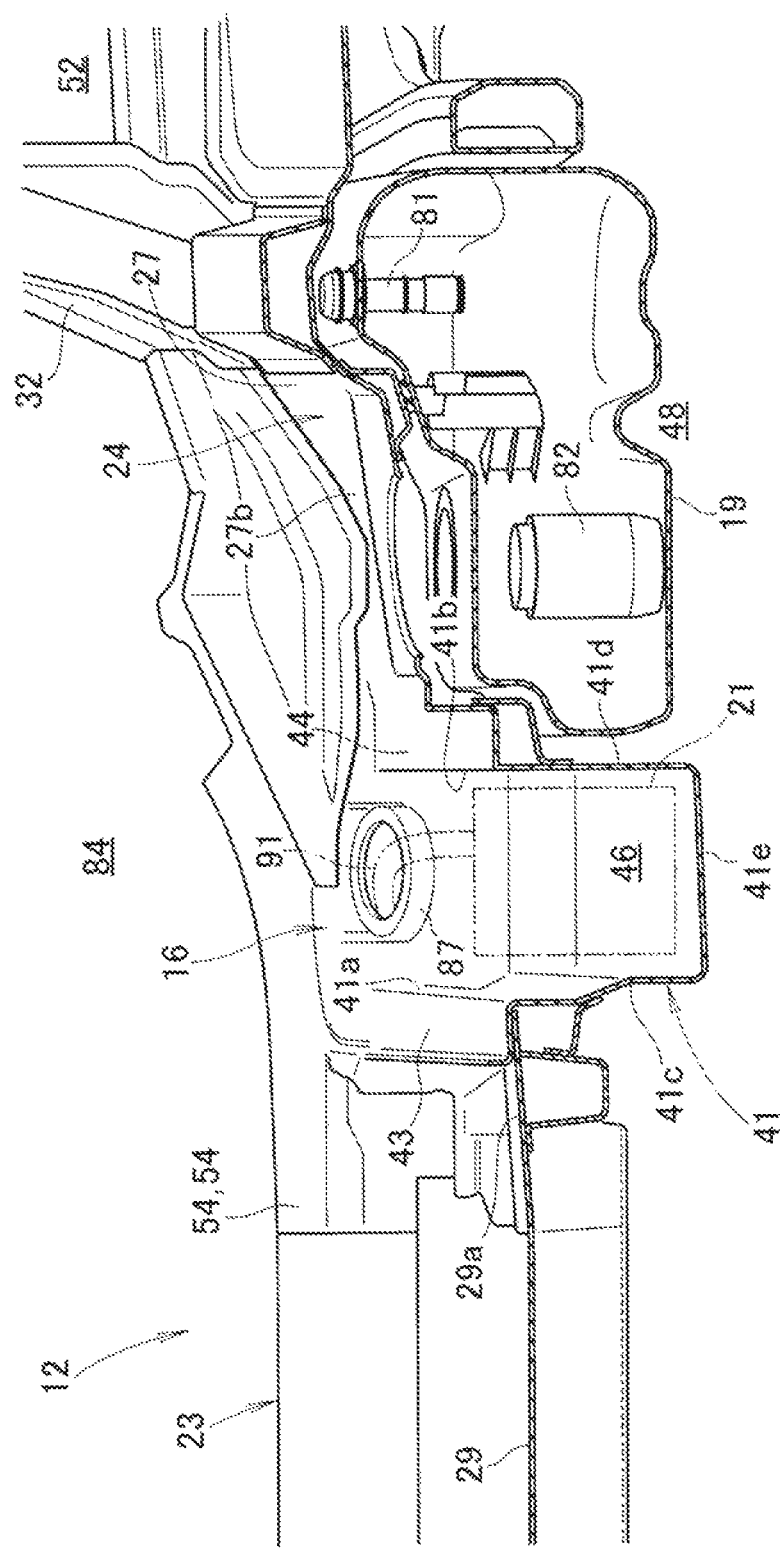
FIG. 4 is a cross-sectional view showing a hybrid vehicle according to one embodiment of the present disclosure.

As shown in FIG. 4, in the hybrid vehicle 12, the front floor unit 23 and the rear floor unit 24 are coupled by the second middle floor unit 16, and the second fuel tank 19 is arranged below the rear floor unit 24.

The second middle floor unit 16 includes a housing 41 which has an opening at an upper portion and has a hollow extending downward from the opening, a first cross-member 43 which is formed at a front end portion 41a of the housing 41, and a second cross-member 44 which is formed at a rear end portion 41b of the housing 41.

The IPU 21 is provided in an interior 46 of the housing 41.

The IPU 21 is an inverter which is equipped on the hybrid vehicle 12 and is intended to improve fuel efficiency and reduce exhaust gas.

A space 48 of the hybrid vehicle 12 is formed behind the housing 41 in the vehicle longitudinal direction and below the front portion 27b of the rear floor panel 27.

The hybrid vehicle 12 is more fuel-efficient than the gasoline vehicle 11. That is, the second fuel tank 19 of the hybrid vehicle 12 can be made smaller, as compared with the gasoline vehicle 11. Thus, the second fuel tank 19 is arranged in the space 48 of the hybrid vehicle 12.

In other words, the second fuel tank 19 is arranged in a substantially rear half of the space 38 (see FIG. 3) of the gasoline vehicle 11, and the housing 41 is arranged in a remaining front half. The IPU 21 is provided in the interior 46 of the housing 41. With this configuration, the IPU 21 need not be arranged on a rear floor 51 (see FIG. 1), unlike related art. A large luggage space 52 can be secured.

Additionally, the IPU 21 is provided in the interior 46 of the housing 41, which eliminates the need to achieve sharing by the vehicles through providing the IPU 21 on the rear floor 51 as in related art. It is thus possible to keep the weight balances of the gasoline vehicle 11 and the hybrid vehicle 12 the same.

For this reason, good dynamic performance can be ensured for the gasoline vehicle 11 and the hybrid vehicle 12.

The IPU 21 is a heavy load. The arrangement of the IPU 21 that is a heavy load at the center of the hybrid vehicle 12 allows improvement of the dynamic performance of the hybrid vehicle 12.

The housing 41 is formed in a substantially U-shape in cross-section with a front wall 41c, a rear wall 41d, and a bottom portion 41e. The housing 41 is arranged to extend in the vehicle width direction and is a member which is highly rigid especially against an impact load applied from the outer side in the vehicle width direction.

The housing 41 is provided at the second middle floor unit 16, and the rigidity of the second middle floor unit 16 is ensured by the housing 41. Thus, a reinforcing member need not be separately provided for the second middle floor unit 16 to ensure rigidity and protect the IPU 21, which achieves a reduction in the weight of the hybrid vehicle 12.

The first cross-member 43 is formed at the front end portion 41a of the housing 41.

The first cross-member 43 extends in the vehicle width direction and is formed to have a closed cross-section in a substantially rectangular shape. The first cross-member 43 in a state extending in the vehicle width direction is joined to a rear end portion 29a of the floor tunnel 29 (see also FIG. 1). The first cross-member 43 formed to have a closed cross-section enhances the rigidity of the first cross-member 43.

The first cross-member 43 is extended in the vehicle width direction, and the first cross-member 43 is laid horizontally between side sills 54 on two sides of the vehicle body structure 10 (that is, frame members for the vehicle body structure 10). Thus, an impact load applied due to a lateral collision can be supported by the first cross-member 43. This allows the first cross-member 43 to protect a passenger and the IPU 21.

The first cross-member 43 with high rigidity is laid horizontally between the side sills 54 on the two sides, and the rigidity of the vehicle body structure 10 is enhanced by the first cross-member 43. The riding comfort of a passenger can be enhanced by the first cross-member 43.

The first cross-member 43 is joined to the rear end portion 29a of the floor tunnel 29. Thus, an impact load applied due to a lateral collision can be transmitted to the floor tunnel 29 via the first cross-member 43.

This allows the floor tunnel 29 to support an impact load and protect a passenger and the IPU 21.

The joining of the rear end portion 29a of the floor tunnel 29 to the first cross-member 43 can reduce spread of the floor tunnel 29 in the vehicle width direction and distortion in a direction in which the floor tunnel 29 sinks.

Thus, the rigidity of the front floor panel 26 (see FIG. 1) is ensured by the floor tunnel 29. This enhances the rigidity of a mounting portion of the front seat 28 mounted to the front floor panel 26 and allows improvement of the riding comfort of a passenger.

The joining of the rear end portion 29a of the floor tunnel 29 to the first cross-member 43 allows an impact load applied due to a front collision to be transmitted (dispersed) to the first cross-member 43 via the floor tunnel 29.

Thus, an impact load applied to the floor tunnel 29 due to a front collision can be favorably supported in the hybrid vehicle 12.

Figure 5:
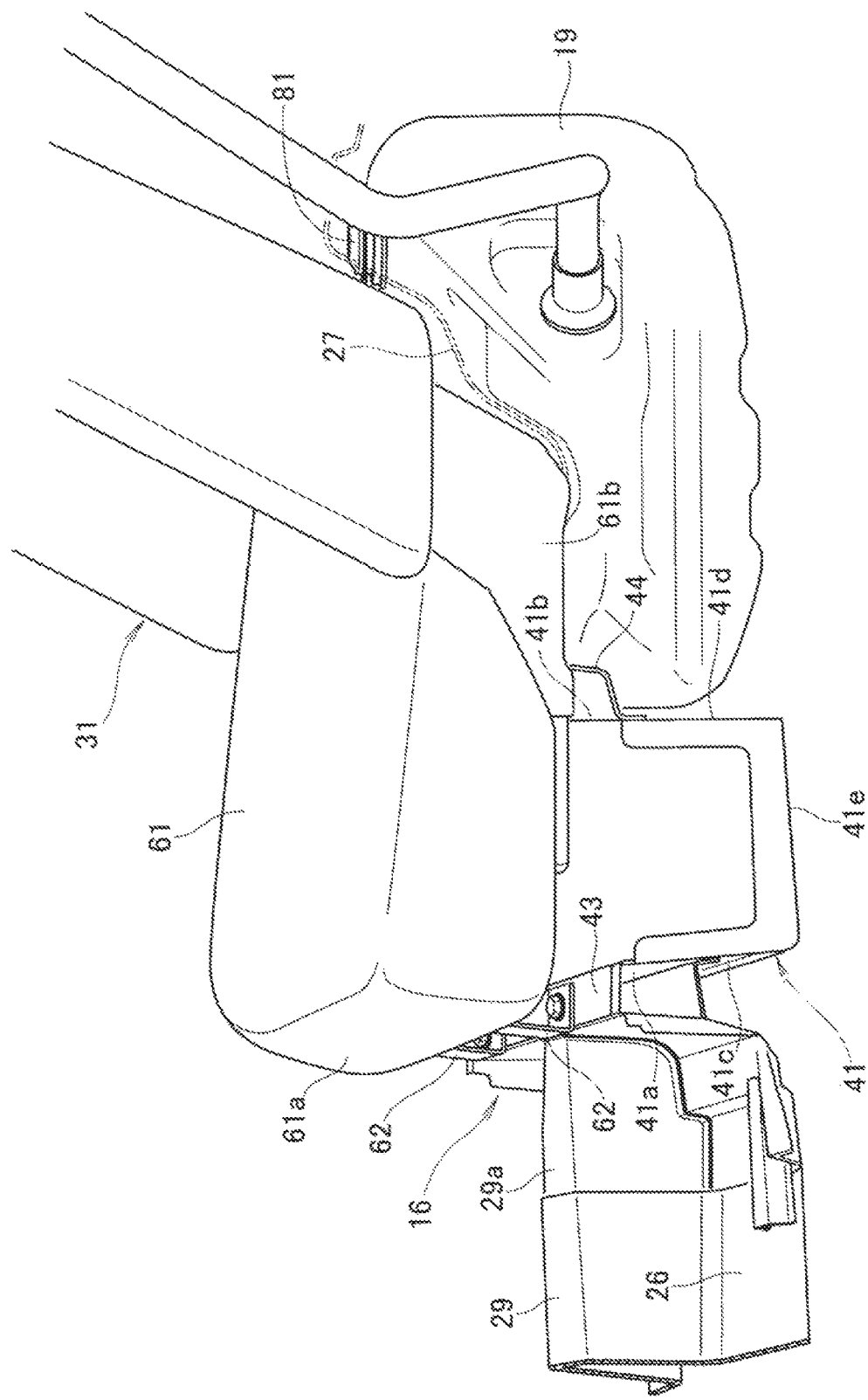
FIG. 5 is a perspective view showing a state in which a rear seat is mounted to the hybrid vehicle according to one embodiment of the present disclosure.

As shown in FIG. 5, each rear seat 31 is mounted to the first cross-member 43. More specifically, a front portion 61a of a seat cushion 61 of the rear seat 31 is mounted to the first cross-member 43 with front mounting brackets 62. Additionally, a rear portion 61b of the seat cushion 61 is mounted to the rear floor panel 27 with a rear mounting bracket (not shown).

The first cross-member 43 is a member with high rigidity. The mounting of the front mounting bracket 62 to the first cross-member 43 with high rigidity enhances the rigidity of the front mounting bracket 62.

With this configuration, the seat cushion 61 is firmly mounted with the front mounting brackets 62, which allows improvement of the riding comfort of a passenger.

Referring back to FIG. 4, the second cross-member 44 is formed at the rear end portion 41b of the housing 41. The second cross-member 44 extends in the vehicle width direction and is formed to have a closed cross-section in a substantially rectangular shape. The second cross-member 44 formed to have a closed cross-section enhances the rigidity of the second cross-member 44.

Thus, an impact load applied due to a lateral collision can be supported by the second cross-member 44 together with the first cross-member 43. This allows the first cross-member 43 and the second cross-member 44 to more favorably protect a passenger and the IPU 21.

The second cross-member 44 with high rigidity is extended in the vehicle width direction, and the second cross-member 44 is laid laterally between the side sills 54 on the two sides of the vehicle body structure 10 (that is, the frame members for the vehicle body structure 10), like the first cross-member 43.

This allows the first cross-member 43 and the second cross-member 44 to enhance the rigidity of the vehicle body structure 10 and more favorably improve the riding comfort of a passenger.

Figure 6:
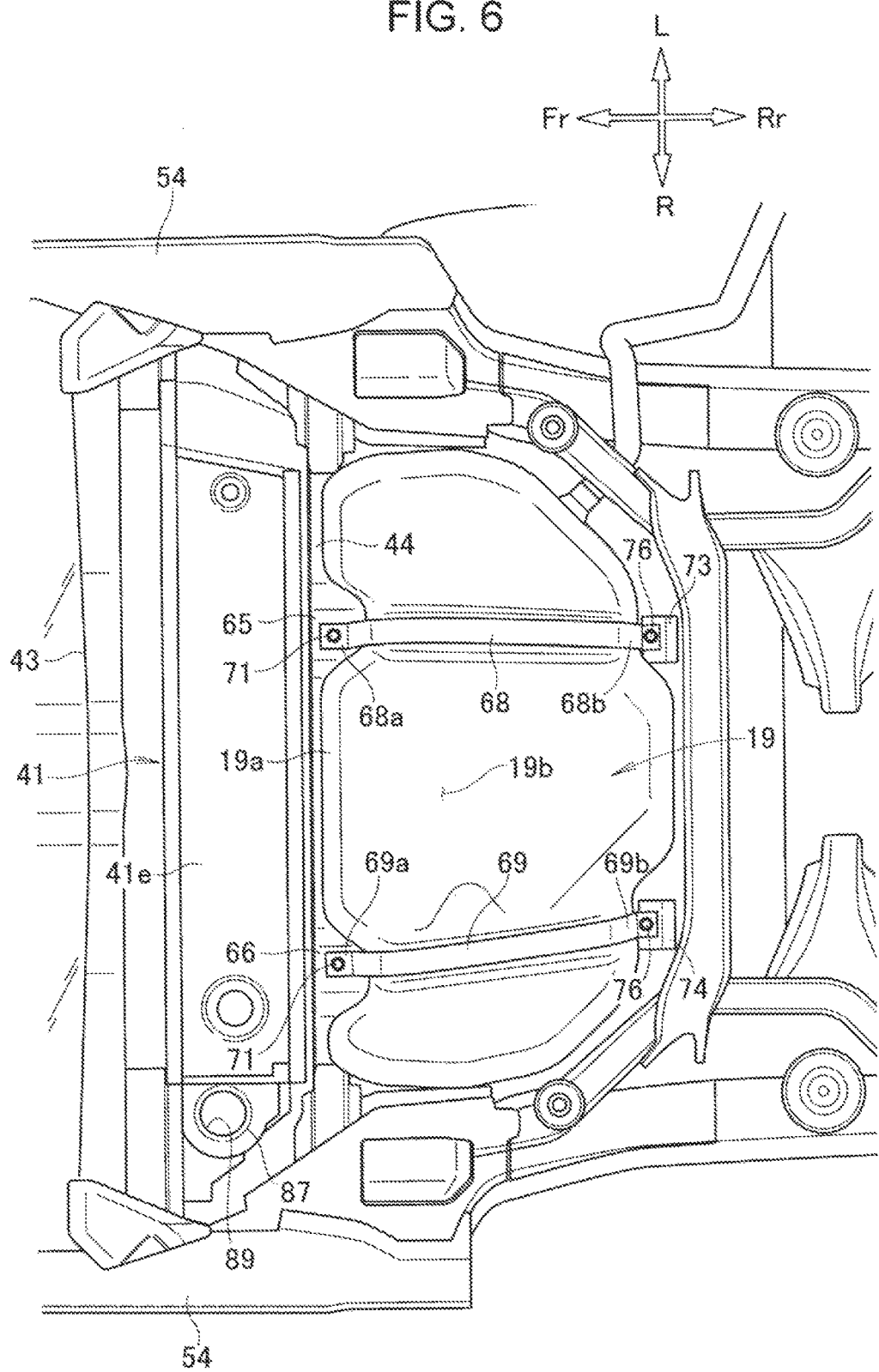
FIG. 6 is a bottom view showing the hybrid vehicle in FIG. 4.

As shown in FIG. 6, the second cross-member 44 has a front left band mounting portion 65 and a front right band mounting portion 66 which bulge downward. The front left band mounting portion 65 and the front right band mounting portion 66 are formed adjacent to a front end portion 19a of the second fuel tank 19 with a predetermined interval therebetween in the vehicle width direction.

A front end portion 68a of a left tank band 68 is fastened to the front left band mounting portion 65 with a bolt 71 and a nut. A front end portion 69a of a right tank band 69 is fastened to the front right band mounting portion 66 with the bolt 71 and a nut.

A rear end portion 68b of the left tank band 68 is fastened to a rear left band mounting portion 73 with a bolt 76 and a nut. A rear end portion 69b of the right tank band 69 is fastened to a rear right band mounting portion 74 with the bolt 76 and a nut.

In this state, the second fuel tank 19 (more specifically, a bottom portion 19b) is supported from below by the left tank band 68 and the right tank band 69. That is, the left tank band 68 and the right tank band 69 that support the second fuel tank 19 are mounted to the second cross-member 44.

Thus, the second fuel tank 19 is supported by the second cross-member 44 with high rigidity. This allows inhibition of inertial movement of the second fuel tank 19 by the second cross-member 44, for example, at the time of a lateral collision.

The inhibition of inertial movement of the second fuel tank 19 allows avoidance of contact of a valve (for example, a pressure regulating valve) 81 of the second fuel tank 19 with the hybrid vehicle 12 and fuel leakage due to a centrifugal force. The valve 81 regulates a pressure in the second fuel tank 19.

The second fuel tank 19 is supported by the second cross-member 44 with high rigidity. Thus, the second cross-member 44 can inhibit vibration from being transmitted from a pump 82 incorporated in the second fuel tank 19.

It is thus possible to reduce noise in a vehicle interior 84 (see FIG. 4) caused by vibration transmitted from the pump 82.

Figure 7:
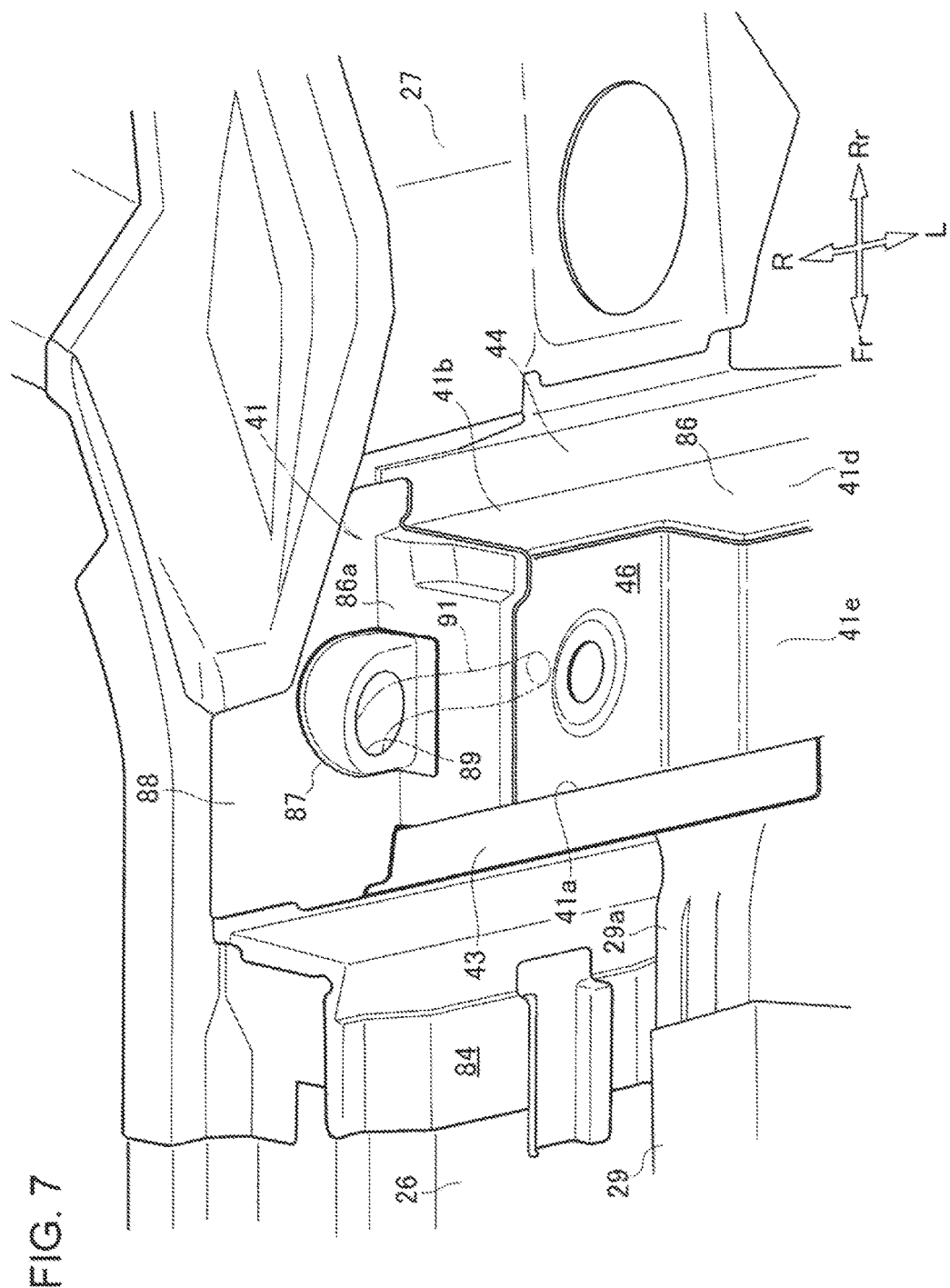
FIG. 7 is a perspective view showing a housing of the hybrid vehicle in FIG. 4.

As shown in FIG. 7, the housing 41 includes a storage recessed portion 86 in which the IPU 21 is provided, an opening member 87 which is provided on the outer side in the vehicle width direction of the storage recessed portion 86, and an overhanging portion 88 which is provided on the outer side in the vehicle width direction of the opening member 87. The opening member 87 has a harness through-hole 89, through which a wire harness 91 is passed.

The opening member 87 is provided at a vehicle-width-direction right outer portion 86a of the storage recessed portion 86. The overhanging portion 88 is at the vehicle-width-direction right outer portion 86a of the storage recessed portion 86 and overhangs on the right outer side in the vehicle width direction of the opening member 87. A plate thickness dimension of the opening member 87 is set to be larger than that of the overhanging portion 88. The IPU 21 (see FIG. 4) is stored in the interior 46 of the storage recessed portion 86.

A relatively high voltage is applied to the wire harness 91 connected to the IPU 21 of the hybrid vehicle 12. For this reason, the wire harness 91 needs to be protected from an impact load, for example, at the time of a collision. The plate thickness dimension of the opening member 87, through which the wire harness 91 is passed, is made larger than that of the overhanging portion 88 on the outer side in the vehicle width direction of the opening member 87.

At the time of a lateral collision, shock energy can be absorbed through crush of the overhanging portion 88 on the outer side in the vehicle width direction.

Deformation of the opening member 87 due to an impact load can be reduced by the larger plate thickness dimension of the opening member 87. This allows the opening member 87 to protect the wire harness 91 and the IPU 21 (see FIG. 4) in the interior 46 of the housing 41 (more specifically, the storage recessed portion 86) and ensures safety of a passenger.

A vehicle body structure according to the present disclosure is not limited to the embodiment described earlier, and appropriate changes, improvements, and the like may be made.

For example, the embodiment has described an example in which the vehicle body structure 10 is composed of a front floor unit, a rear floor unit, and a middle floor unit. The present disclosure, however, is not limited to the example. It is also possible to add another unit to the three units of the vehicle body structure 10.

The embodiment has taken the IPU 21 as an example of an electrical component. The present disclosure, however, is not limited to this. For example, any other electrical component, such as a battery, may be applied to the present disclosure.

The shapes and the configurations of a vehicle body structure, a gasoline vehicle, a hybrid vehicle, a platform, first and second middle floor units, first and second fuel tanks, an IPU, a front floor unit, a rear floor unit, a floor tunnel, a rear seat, a kick-up portion, a planar portion, a housing, first and second cross-members, left and right tank bands, a storage recessed portion, an opening member, an overhanging portion, a harness through-hole, a wire harness, and the like illustrated in the embodiment are not limited to the illustrated ones, and appropriate changes may be made.

The present disclosure is suitably applied to an automobile having a vehicle body structure which includes a platform to be shared by two types of vehicles, a gasoline vehicle and a hybrid vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body structure settable in a gasoline vehicle and a hybrid vehicle, the vehicle body structure comprising:
a front floor unit, a rear floor unit, and a middle floor unit which couples the front floor unit and the rear floor unit, wherein
the gasoline vehicle and the hybrid vehicle share the front floor unit and the rear floor unit,
the middle floor unit includes a gasoline-vehicle middle floor unit or a hybrid-vehicle middle floor unit, the gasoline-vehicle middle floor unit and the hybrid-vehicle middle floor unit being interchangeable with each other,
the gasoline-vehicle middle floor unit includes a kick-up portion which extends upward and a planar portion which extends rearward from an upper end portion of the kick-up portion such that the planar portion is substantially flat,
the hybrid-vehicle middle floor unit includes a housing which has an opening at an upper portion and has a recess extending downward from the opening, the housing including an electrical component provided in an interior of the housing,
the gasoline vehicle includes a fuel tank which extends under the gasoline-vehicle middle floor unit and the rear floor unit, and
the hybrid vehicle includes a fuel tank which is disposed under the rear floor unit.

2. The vehicle body structure according to claim 1, wherein
the hybrid-vehicle middle floor unit includes, at a front end portion of the housing, a first cross-member which extends in a vehicle width direction and has a closed cross-section.

3. The vehicle body structure according to claim 2, wherein the first cross-member is joined to a rear end portion of a floor tunnel.

4. The vehicle body structure according to claim 2, wherein a rear seat is mounted to the first cross-member.

5. The vehicle body structure according to claim 1, wherein
the hybrid-vehicle middle floor unit includes, at a rear end portion of the housing, a second cross-member which extends in a vehicle width direction and has a closed cross-section.

6. The vehicle body structure according to claim 5, wherein a tank band which supports the fuel tank for the hybrid vehicle is mounted to the second cross-member.

7. The vehicle body structure according to claim 1, wherein
the housing includes
a storage portion in which the electrical component is provided,
an opening member which is provided on an outer side in a vehicle width direction of the storage portion and has a harness through-hole, through which a wire harness is passed, and
an overhanging portion which is provided on the outer side in the vehicle width direction of the opening member, and
a plate thickness dimension of the opening member is larger than a plate thickness dimension of the overhanging portion.

8. A kit of a vehicle body structure comprising:
a front floor unit, a rear floor unit, and a middle floor unit which is configured to connect the front floor unit to the rear floor unit, wherein
the middle floor unit includes a gasoline-vehicle middle floor unit for a gasoline vehicle and a hybrid-vehicle middle floor unit for a hybrid vehicle, the gasoline-vehicle middle floor unit and the hybrid-vehicle middle floor unit being interchangeable with each other,
the gasoline-vehicle middle floor unit includes a kick-up portion which extends upward and a planar portion which extends rearward from an upper end portion of the kick-up portion such that the planar portion is substantially flat, the hybrid-vehicle middle floor unit includes a housing which has an opening at an upper portion and has a recess extending downward from the opening, the housing including an electrical component provided in an interior of the housing, the kit further comprising:

a gasoline-vehicle fuel tank being configured to be installed into a space extending under the gasoline-vehicle middle floor unit and the rear floor unit, and a hybrid vehicle fuel tank being configured to be installed into a space under the rear floor unit.

9. The kit of the vehicle body structure according to claim 8, wherein the gasoline-vehicle fuel tank has a length corresponding to the space extending under the gasoline-vehicle middle floor unit and the rear floor unit, and the hybrid vehicle fuel tank has a length corresponding to the space under the rear floor unit.

10. A method of producing a vehicle body structure comprising steps of:

preparing a front floor unit, a rear floor unit, and a middle floor unit which is configured to connect the front floor unit to the rear floor unit, wherein the middle floor unit includes a gasoline-vehicle middle floor unit for a gasoline vehicle or a hybrid-vehicle middle floor unit for a hybrid vehicle, the gasoline-vehicle middle floor unit and the hybrid-vehicle middle floor unit being interchangeable with each other, the gasoline-vehicle middle floor unit includes a kick-up portion which extends upward and a planar portion which extends rearward from an upper end portion of the kick-up portion such that the planar portion is substantially flat, the hybrid-vehicle middle floor unit includes a housing which has an opening at an upper portion and has a recess extending downward from the opening, the housing including an electrical component provided in an interior of the housing, the method further comprising steps of:

preparing a gasoline-vehicle fuel tank being configured to be installed into a space extending under the gasoline-vehicle middle floor unit and the rear floor unit;

preparing a hybrid vehicle fuel tank being configured to be installed into a space under the rear floor unit;

connecting the front floor unit and the rear floor unit via the gasoline-vehicle middle floor unit; and installing the gasoline-vehicle fuel tank into the space extending under the gasoline-vehicle middle floor unit and the rear floor unit.

11. The method according to claim 10, further comprising:

connecting the front floor unit and the rear floor unit via the hybrid vehicle middle floor unit; and installing the hybrid vehicle fuel tank into the space under the rear floor unit.

* * * * *